(12) United States Patent
Timokhin et al.

(10) Patent No.: US 8,184,065 B2
(45) Date of Patent: May 22, 2012

(54) EFFICIENT MODE SWITCHING IN A VIDEO PROCESSOR SYSTEM

(75) Inventors: Konstantin Timokhin, Walnut Creek, CA (US); Robert Gardyne, Oakland, CA (US)

(73) Assignee: RGB Spectrum, Alameda, CA (US)

( * ) Notice: Subject to any disclaimer, the term of this patent is extended or adjusted under 35 U.S.C. 154(b) by 771 days.

(21) Appl. No.: 11/938,664

(22) Filed: Nov. 12, 2007

(65) Prior Publication Data
US 2009/0122011 A1    May 14, 2009

(51) Int. Cl.
*G09G 5/00* (2006.01)

(52) U.S. Cl. ............ 345/1.1; 345/157; 345/163

(58) Field of Classification Search ............ 345/1.1–3.1, 345/157, 204, 163, 168, 519
See application file for complete search history.

(56) References Cited

U.S. PATENT DOCUMENTS

| | | | | |
|---|---|---|---|---|
| 6,473,103 | B1* | 10/2002 | Bailey et al. ............... | 715/794 |
| 7,428,606 | B2* | 9/2008 | Liu et al. ............... | 710/62 |
| 2002/0116539 | A1 | 8/2002 | Bryczkowski et al. | |
| 2005/0275641 | A1* | 12/2005 | Franz ............... | 345/204 |
| 2006/0117106 | A1* | 6/2006 | Abdo et al. ............... | 709/227 |
| 2006/0284785 | A1* | 12/2006 | Bitterlich ............... | 345/1.1 |
| 2006/0285514 | A1* | 12/2006 | Hoerl et al. ............... | 370/328 |
| 2007/0022176 | A1 | 1/2007 | Kobayashi et al. | |
| 2007/0115992 | A1* | 5/2007 | Weinstock et al. ........... | 370/392 |
| 2007/0257883 | A1* | 11/2007 | Ke ............... | 345/157 |
| 2008/0064933 | A1* | 3/2008 | Garibaldi et al. ............. | 600/300 |
| 2009/0079694 | A1* | 3/2009 | Day et al. ............... | 345/163 |
| 2009/0080856 | A1* | 3/2009 | Day et al. ............... | 386/66 |

OTHER PUBLICATIONS

KaVoom, KaVoom KM brochure, www.kavoom.biz, published online Mar. 19, 2005.*
Neslo software, Desktop Rover, www.neslosoftware.com, published online Jul. 29, 2005.*
PCT Notification of Transmittal of the International Search Report and The Written Opinion of the International Searching Authority, Application No. PCT/US 08/76737 dated Nov. 21, 2008.

* cited by examiner

*Primary Examiner* — Amare Mengistu
*Assistant Examiner* — Dimitriy Bolotin
(74) *Attorney, Agent, or Firm* — Kwan Intellectual Property Law

(57) ABSTRACT

Methods and apparatus are provided for efficiently controlling source computers connected to a display system. A control computer is connected to one or more source computers and video output is shown on a display system. A mouse and associated input devices may operate in video processor mode or source computer mode based on mouse x-coordinate and y-coordinate position information. Other modes such as control computer mode are also possible. In particular instances, a mouse and associated input devices operate in source computer mode to control a particular source computer when the mouse pointer position resides within one of the source computer windows. A mode of operation may switch based on a change in mouse position.

25 Claims, 7 Drawing Sheets

EFFICIENT MODE SWITCHING IN A VIDEO PROCESSOR SYSTEM

DESCRIPTION OF RELATED ART

The present disclosure relates to integrated control systems. In some examples, the techniques of the present disclosure provide mechanisms for efficiently managing source computers.

A video processor presents the video input from the multiple source computers and other video sources on or across one or more displays. Placement of windows allows juxtaposition of related information, positioning and scaling.

However, conventional systems provide somewhat limited mechanisms for controlling the source images. Consequently, the techniques of the present invention provide improved mechanisms for control of source computers connected to a video processor such as a single-screen multiviewer or video wall controller attached to a display system.

OVERVIEW

Methods and apparatus are provided for efficiently controlling source computers connected to a display system. A control computer is connected to one or more source computers and video output is shown on a display system. A mouse and associated input devices may operate in video processor mode or source computer mode based on mouse x-coordinate and y-coordinate position information. Other modes such as control computer mode are also possible. In particular instances, a mouse and associated input devices operate in source computer mode to control a particular source computer when the mouse pointer position resides within one of the source computer windows. A mode of operation may switch based on a change in mouse position.

These and other features of the present invention will be presented in more detail in the following specification of the invention and the accompanying figures, which illustrate by way of example the principles of the invention.

BRIEF DESCRIPTION OF THE DRAWINGS

The disclosure may best be understood by reference to the following description taken in conjunction with the accompanying drawings, which illustrate particular embodiments of the present invention.

DESCRIPTION OF PARTICULAR EMBODIMENTS

Figure 1:
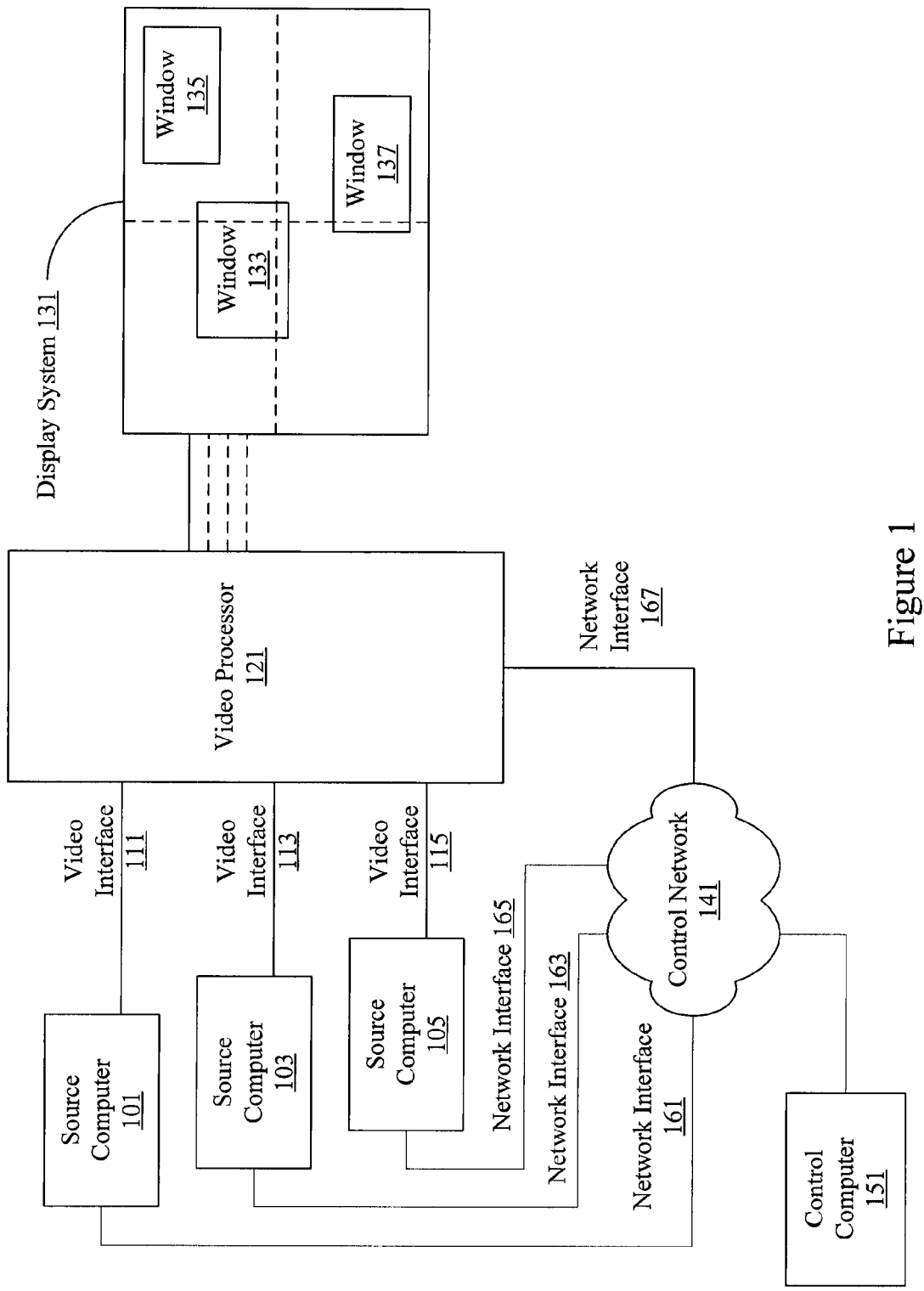
FIG. 1 is a diagrammatic representation showing an integrated control system.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of particular interfaces and networks. However, it should be noted that the techniques and mechanisms of the present invention can be used with a variety of interfaces and networks. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a processor is used in a variety of contexts. However, it will be appreciated that multiple processors can also be used while remaining within the scope of the present invention unless otherwise noted. Furthermore, the techniques and mechanisms of the present invention will sometimes describe two entities as being connected. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Many remote desktop agents provide a user at a control computer the ability to manipulate a source computer. For example, tools such as pcAnywhere™ available from Symantec Corporation allow a user to connect to remote devices over a network to manage and manipulate the remote devices. Virtual Network Computing or VNC™ available from RealVNC Limited provides remote control software that allows a user to view and interact with a source computer using a program on another computer on the Internet.

Some display systems such as multiviewer and video wall systems provide a user with the ability to control a number of different source computers from a single control computer. In many instances, these source computer systems are computer systems each with their own processors, memory, storage, input interfaces, and output interfaces. According to particular embodiments, source computers include computing devices and keyboard and mouse-controlled video sources. Examples of keyboard and mouse-controlled video sources include pan-tilt-zoom (PTZ) cameras, digital video recorders (DVR), etc. A video processor allows images from the various source computers to be manipulated to provide a customized display of information on a display system having one or more display devices.

In many instances, switching between source computer control and system control can be relatively awkward. For example, in a display system example, a user may have to enter individual Internet Protocol addresses associated with the source computer the user wishes to control. Other examples require extensive sequences of mouse clicks to control the appropriate source computer.

The techniques of the present invention recognize that the control of the individual source computers remains disjointed. Consequently, a control computer is provided with an interface to allow efficient control and manipulation of manipulate individual source computers. According to various embodiments, mouse position determines whether the user is manipulating a source computer or a system. In particular embodiments, if the mouse pointer resides within a source computer window, the mouse pointer is a source computer cursor and manipulates source computer objects in the window. The user can operate the source computer as though the user were physically present at the source computer. If the mouse pointer is outside any source computer window, the mouse pointer operates in video processor mode and various source computer windows can be moved and resized. System operations can also be controlled.

A variety of systems can take advantage of efficient switching between modes. In one example, a control computer connected to two source computers over a network provide a user with the ability to switch between control of the source computers and operation of a control computer. A control computer monitor may show multiple windows associated with individual source computers. A video wall or multiviewer system can also use efficient switching between control of a source computer, operation of a video processor, and operation of a control computer. Other modes are also possible. Systems having single, multiple, or hybrid networks can have efficient switching at a display system.

FIG. 1 is a diagrammatic representation showing one example of a system that can use the techniques of the present invention. The system includes a control computer 151. According to various embodiments, the control computer 151 is a computer system that has an input interface such as a keyboard, mouse, touchpad, keypad, touchscreen, etc as well as a network interface connected to a control network 141. In particular embodiments, the control network can be one of a variety of different networks, such as Ethernet, wireless, serial, or Bluetooth™. According to various embodiments, the control network is any network that does not sufficiently support video transmission from source computers 101, 103, and 105 to a video processor 121. In particular embodiments, source computers 101, 103, and 105 may be computer systems, Pan-Tilt-Zoom (PTZ) cameras, Digital Video Recorders (DVRs), etc. The control network 141 may not sufficiently support video transmission because of bandwidth or latency considerations.

According to various embodiments, the control network 141 is connected to source computers 101, 103, and 105 through network interfaces 161, 163, and 165. In particular embodiments, any device that can be manipulated using input devices such as keyboard and mice to provide to provide video is referred to herein as a source computer. According to various embodiments, a camera is manipulated using an input remote to provide video. Each source computer 101, 103, and 105 includes a processor and memory and may or may not be connected to a keyboard and a mouse. Instead of requiring input devices directly connected to each source computer, the source computers 101, 103, and 105 can be controlled by input devices connected to a control computer 151. The input device control signals can be conveyed over the control network 141 to operate individual source computers 101, 103, 105. According to various embodiments, source computers 101, 103, and 105 may simply be processing systems, or controlled video sources, without attached keyboards or monitors.

Source computers 101, 103, and 105 have video interfaces 111, 113, and 115 respectively connected to a video processor 121. According to various embodiments, the video interfaces 111, 113, and 115 are Digital Visual Interface (DVI) or High Definition Multimedia Interface (HDMI) connections. In particular embodiments, the video interfaces 111, 113, and 115 are operable to carry video from sources computers 101, 103, and 105 in a much more effective manner than a control network 141 could carry video.

The video processor 121 receives video from source computers 101, 103, and 105 over video interfaces 111, 113, and 115. It is also possible that the video processor 121 receives some video over a control network 141 as well. According to particular embodiments, the video processor performs processing that involves receiving video, performing modification to the video, and/or selecting video from the source computers 101, 103, and 105. The video processor 121 takes the video and sends the video to display system 131. Display system 131 may be a standard monitor, screen, display, projector, or combination of multiple monitors, screens, displays, and projectors. The video processor 121 also receives input signals from the control computer 151 over the control network 141 and network interface 167. According to various embodiments, the keyboard and mouse input from the control computer 151 received at source computers 101, 103, and 105 is used to configure and manipulate source computers 101, 103, and 105 and corresponding windows 133, 135, 137. Objects in the display system 131 and objects in windows 133, 135, and 137 can be controlled using input devices connected to the control computer 151. In some examples, windows 133, 135, and 137 correspond to source computers 101, 103, and 105 respectively. In video processor mode, a mouse pointer can move and resize windows 133, 135, and 137 as well as perform other video processor operations. In a source computer mode, a mouse pointer can control source computer operations such as running source computer applications, opening files on source computers, etc. In a control computer mode, a mouse pointer can operate control computer functions.

In particular embodiments, a mouse pointer in source computer mode can start a video feed from source computer 101 in window 133. The video feed itself may be provided over video interface 111.

According to various embodiments, the video processor is a media aggregation device such as a MediaWall® or SuperView® Processor available from RGB Spectrum of Alameda, Calif. In particular embodiments, the video processor is a specially configured system or appliance configured to receive video over video inputs and control signals over a control network. In some examples, the system is a specially configured computer system based device.

According to various embodiments, the control computer may display a plurality of labeled rectangles, or reduced resolution windows, each associated with one of the source computers or other controlled video sources. In particular embodiments such a control computer display may be rendered as the function of a network-transmitted Java applet, such as a WCP Control Panel from RGB Spectrum of Alameda, Calif.

Communication between the control computer and source computer can be encrypted. All communications within the integrated control system with keyboard video and mouse (KvM) can be secure. According to various embodiments, the video interfaces are local and secure. The control network may be shared with other entities such as other personnel in an enterprise environment, but communications over the control network can be secured using encryption.

It should be noted that although the components of an integrated control system with keyboard video and mouse (KvM) are shown as separate entities, it will be recognized that some entities can be combined with others. For example, in some examples, a control computer 151 can be integrated with a video processor 121. In other examples, one of the source computers can also be a control computer 151. A variety of arrangements are possible as will be appreciated.

Figure 2:
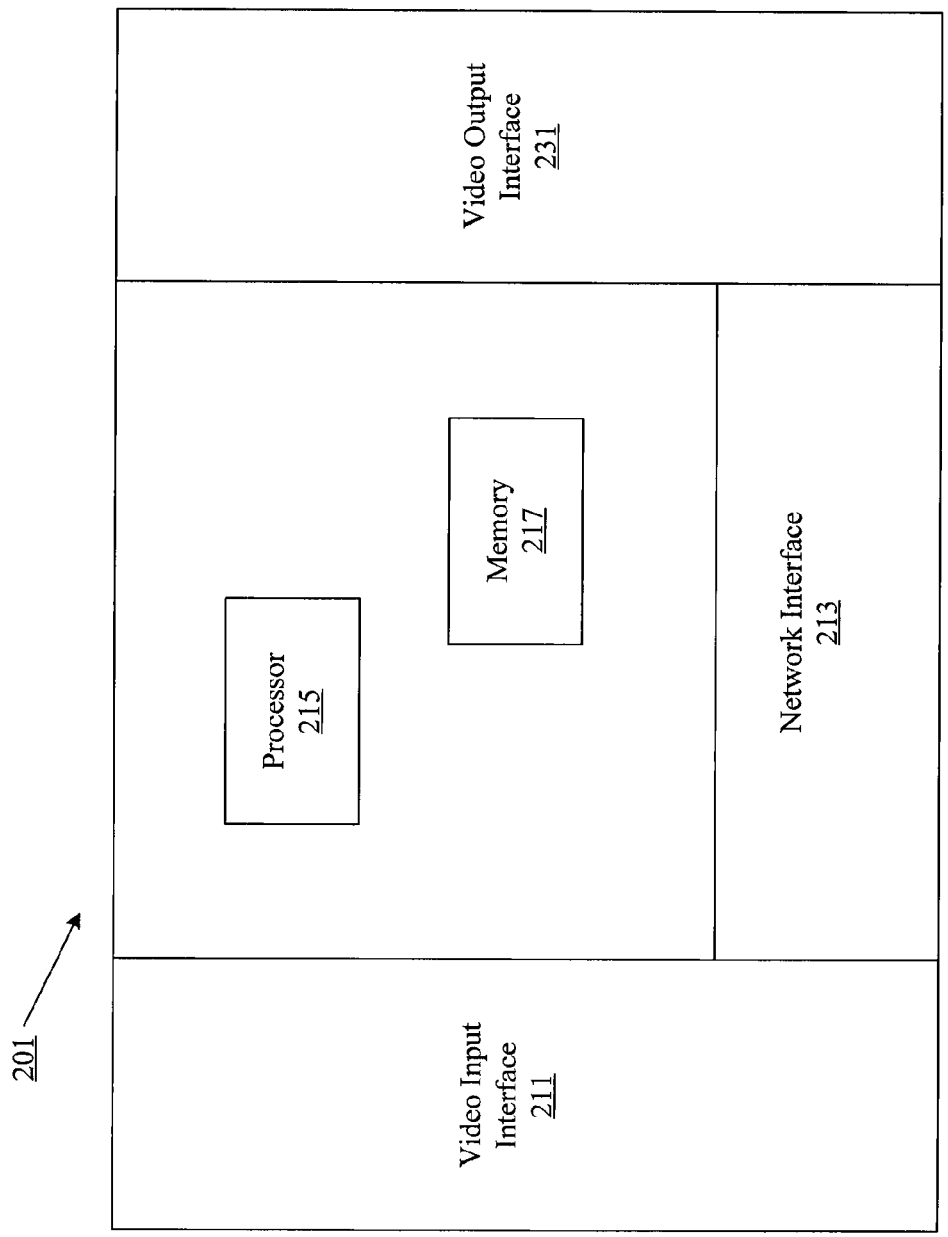
FIG. 2 is a diagrammatic representation showing a video processor.

FIG. 2 is a diagrammatic representation showing one example of a video processor. According to various embodiments, the video processor is a specially configured appliance operable to receive video input and display video output in various windows located on a display system. In particular embodiments, the video processor is a media aggregation device such as a MediaWall® or SuperView® Processor available from RGB Spectrum of Alameda, Calif. In other particular embodiments, the video processor is a computer system, server, board, device or chip. According to various embodiments, video processor 201 includes a processor 215, memory 217, network interface 213, video input interface 211, and video output interface 211.

In particular embodiments, the video input interface 211 is a collection of Digital Video Interfaces (DVI) that receives video over video connections from source computers or source video sources. Video output interface 231 sends video output over one or more lines to a display system. The video output interface 231 may also be a collection of Digital Video Interfaces (DVI). Other types of interfaces such as High Definition Multimedia Interface (HDMI) can also be used. Network interface 213 receives keyboard and mouse signals from a control computer. According to various embodiments, the network interface 213 is an enterprise network used by a variety of computers outside of the integrated control system with keyboard video and mouse (KvM). The network interface 213 may connect the video processor 201 to an IP network, wireless network, etc. According to various embodiments, the network interface 213 can be used for any type of data from source and control computers including input signals and video signals. However, because it is difficult to transport video over a control network such as an Ethernet network, video from source computers is sometimes directly transmitted over dedicated lines to the video processor.

According to various embodiments, the video processor is a real time video/data wall processor that supports a display system, including one or more projectors, cubes, monitors, or displays. Any single display or multiple display grouping showing video data from multiple computers systems is referred to herein as a display system. According to various embodiments, the video processor works with any tiled display, and has adjustments to compensate for the bezel between panels or cubes, as well as overlapped outputs to support edge blending on a continuous screen. In particular embodiments, the video processor can provide multiple graphics and video windows on multiple screens. For examples, eight graphics and eight video signals can be displayed in sixteen windows over six screens. Some examples of video graphics signals include Red Green Blue (RGB), Digital Video Interface (DVI), as High Definition Multimedia Interface (HDMI). In particular embodiments, video inputs may be composite, component, or S-Video.

Figure 3A:
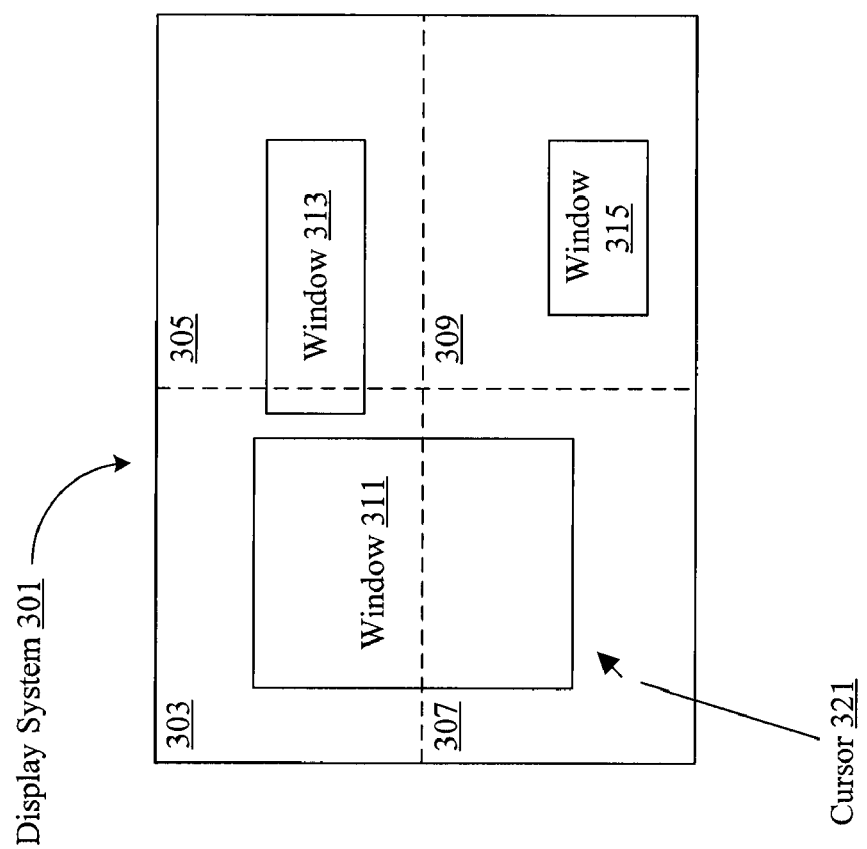
FIG. 3a is a diagrammatic representation showing a display system.

FIG. 3A is a diagrammatic representation showing one example of a display system 301. According to various embodiments, the display 301 includes monitors 303, 305, 307, and 309. In particular embodiments, the display system 301 may include one, two, four, six, or sixteen tiled displays. The display system 301 is connected to a video processor through one or more video lines. In particular embodiments, each video line is connected to a corresponding display 303, 305, 307, or 309. According to various embodiments, the display system 301 includes a cursor 321 associated with a control computer. The windows 311, 313, and 315 are associated with source computers. Each source computer may correspond to a particular window. In particular embodiments, a source computer can spawn multiple windows.

Any video including images and data in windows 311, 313, and 315 may be provided over direct video connections, or over a sufficiently high-speed network. Control information such as cursor control may be provided over a control network. According to various embodiments, a cursor 321 is associated with a particular cursor depiction when it is in video processor mode.

Figure 3B:
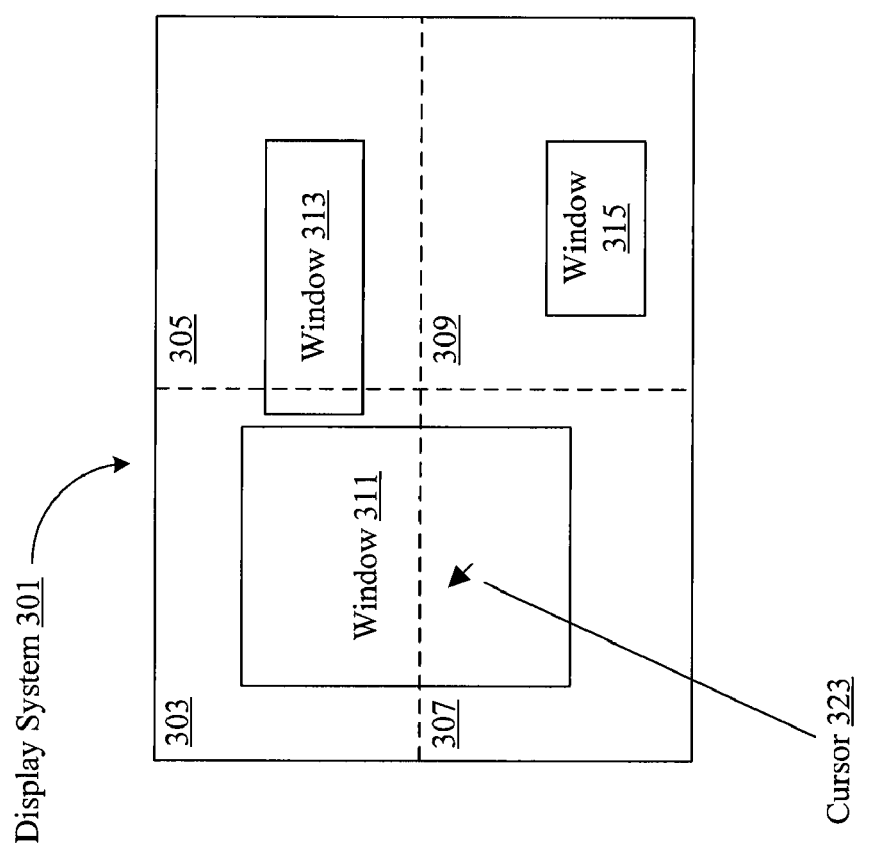
FIG. 3b is a diagrammatic representation showing a display system.

FIG. 3B is a diagrammatic representation showing another example of a display system 301 with a cursor 323 in a different mode. In one example, a cursor 323 points to the top right when it is in video processor mode while it points to the top left when it is in source computer mode. According to various embodiments, the display 301 includes monitors 303, 305, 307, and 309. In particular embodiments, the display system 301 may include one, two, four, six, or sixteen tiled displays. The display system 301 is connected to a video processor through one or more video lines. In particular embodiments, each video line is connected to a corresponding display 303, 305, 307, or 309. According to various embodiments, the display system 301 includes a cursor 323 associated with a control computer. The windows 311, 313, and 315 are associated with source computers. Each source computer may correspond to a particular window. In particular embodiments, a source computer can spawn multiple windows.

In particular embodiments, a cursor may switch modes when it moves to a particular position. For example, a cursor may be associated with a particular x-coordinate and y-coordinate position in a system window. If the x-coordinate and y-coordinate pairing resides within the window frame of a particular source computer, the cursor may switch into source computer mode. Alternatively, a user may need to click inside a window frame before the cursor switches into source computer mode. It should be noted that a mouse position can be represented in a variety of manners. Any positional information associated with a mouse position in a display system is referred to herein as an x-coordinate and y-coordinate position.

Figure 4:
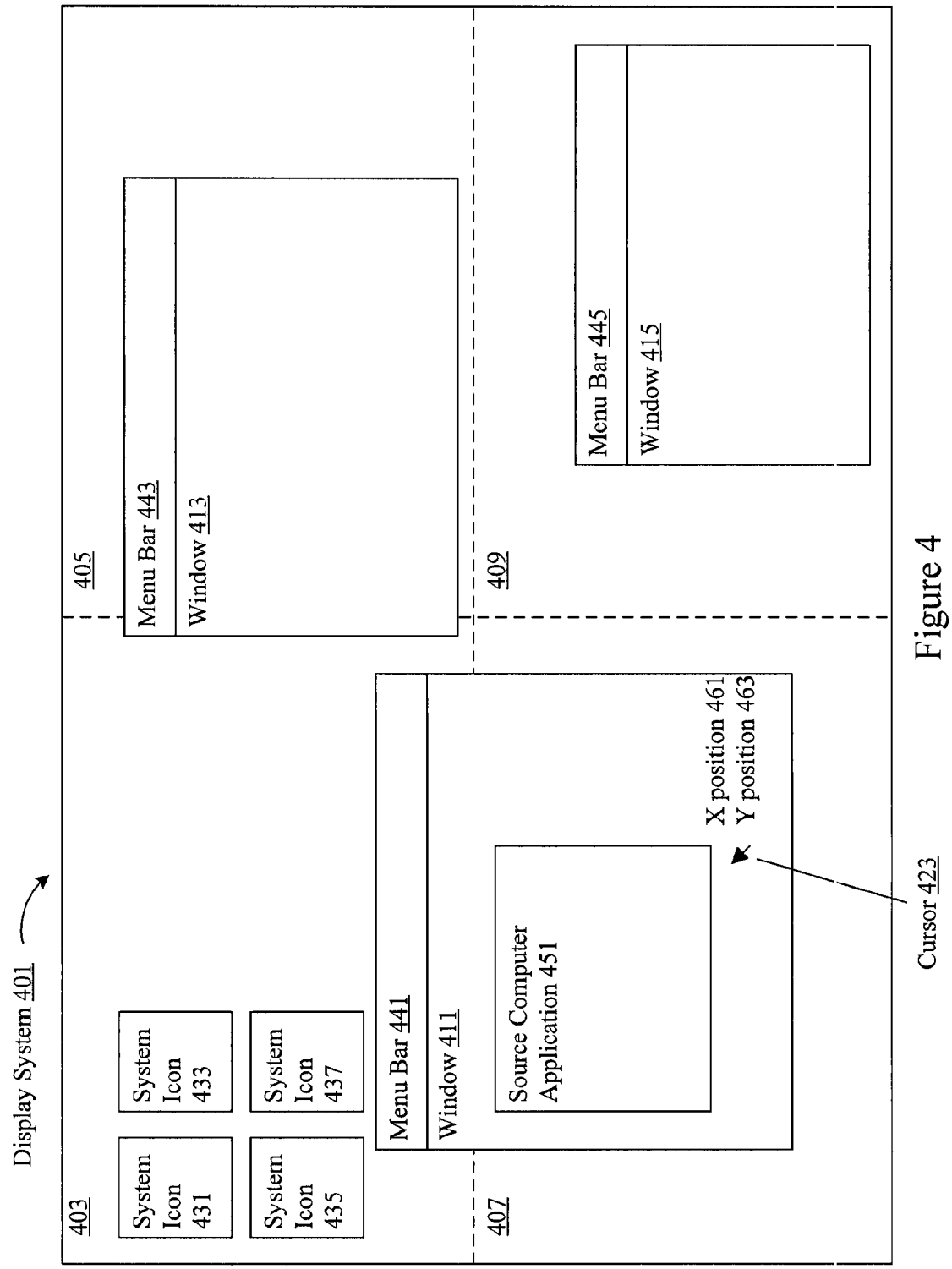
FIG. 4 is a diagrammatic representation showing system icons in a display system.

FIG. 4 is a diagrammatic representation showing another example of a display system 401. According to various embodiments, a display system 401 includes monitors 403, 405, 407, and 409. In particular embodiments, the display system 401 may include one, two, four, six, or sixteen tiled displays. The display system 401 is connected to a video processor through one or more video lines. In particular embodiments, each video line is connected to a corresponding display 403, 405, 407, or 409. According to various embodiments, the display system 401 includes a cursor 423 associated with a control computer. The windows 411, 413, and 415 are associated with source computers. Each source computer may correspond to a particular window. In particular embodiments, a source computer can spawn multiple windows. According to various embodiments, windows 411, 413, and 415 have menu bars 441, 443, and 445 respectively that allow movement and/or resizing of windows 411, 413, and 415.

In particular embodiments, when a cursor 423 moves over a menu bar 441, 443, or 445, the cursor 423 remains in video processor mode. In video processor mode, the cursor 423 can manipulate windows as well as control system objects such as system icons 431, 433, 435, and 437. In some examples, cursor 423 can change the resolution of the display system

401. According to various embodiments, when a cursor 423 is in a particular mode, other input devices such as keyboards and touchpads are also in the same mode. That is, input mode becomes video processor mode or source computer mode based on mouse position information.

When a cursor 423 moves into a window 411, the cursor 423 as well as other input devices switch to source computer control mode. The cursor can then perform source computer operations such as controlling source computer application 451. When a cursor 423 moves into a window 413, the cursor 423 as well as other input devices switch to source computer control mode and control the source computer associated with window 413. When a cursor 423 moves into a window 415, the cursor 423 as well as other input devices switch to source computer control mode and control the source computer associated with window 415.

According to various embodiments, the cursor 423 has a coordinate corresponding to an x-coordinate 461 and a y-coordinate 463. In particular embodiments, every position on a display system 401 has a particular x-coordinate y-coordinate pairing. Windows 411, 413, and 415 also have locations specified by sets of x-coordinate y-coordinate pairings. For example, a window may be specified by 4 coordinates. Alternatively, a smaller number of coordinates along with width and height information may be used. A variety of mechanisms can be used to internally represent a mouse position, such as radians and length, but all of these mechanisms will be referred to herein as providing an x-coordinate and a y-coordinate position for the mouse pointer. According to various embodiments, the bottom left corner of the display system 401 corresponds to a (0,0) coordinate position while the top right corner corresponds to the resolution such as (3840, 5120).

Figure 5:
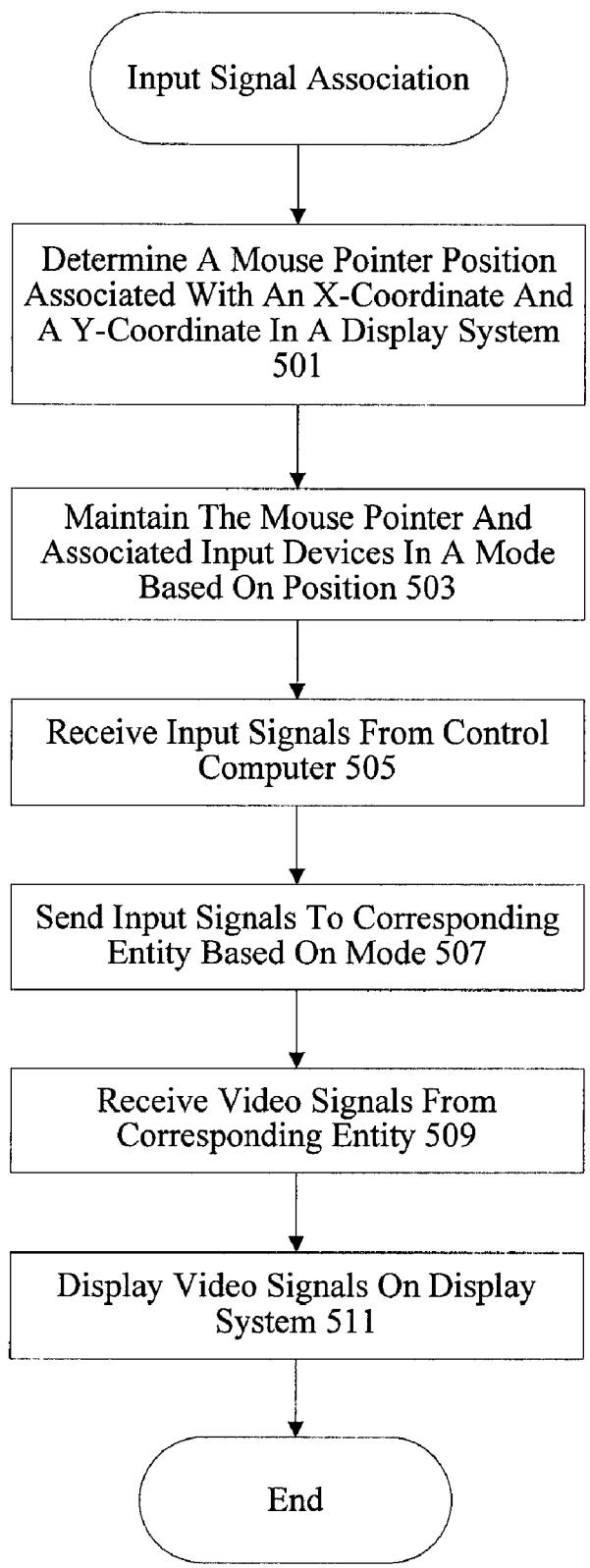
FIG. 5 is a process flow diagram showing a technique for associating input signals.

FIG. 5 is a flow process diagram showing one example of a technique for associating input signals with the appropriate source computer or system. At 501, a mouse pointer position associated with an x-coordinate and a y-coordinate in a display system is determined. In some examples, a position may be determined by an application. In other examples, the position may be determined by an operating system or even firmware and the position information may be passed through application program interfaces. At 503, an input mode is maintained based on the mouse pointer position. For example, the input mode may be a video processor mode based on the mouse pointer position, or the mode may be a source computer mode associated with particular system in a group of source computers. At 505, input signals are received from the control computer. The input signals may be keyboard, touchpad, mouse, microphone, etc. signals from a control computer.

At 507, input signals are sent to a corresponding entity based on mode. According to various embodiments, if the current mode is a video processor mode, input signals are sent to a processor controlling system operation. If the current mode is a source computer mode, input signals are sent to a processor associated with the corresponding source computer. At 509, video signals are received from the corresponding source computer or system. At 511, video signals are shown on the display system 511.

Figure 6:
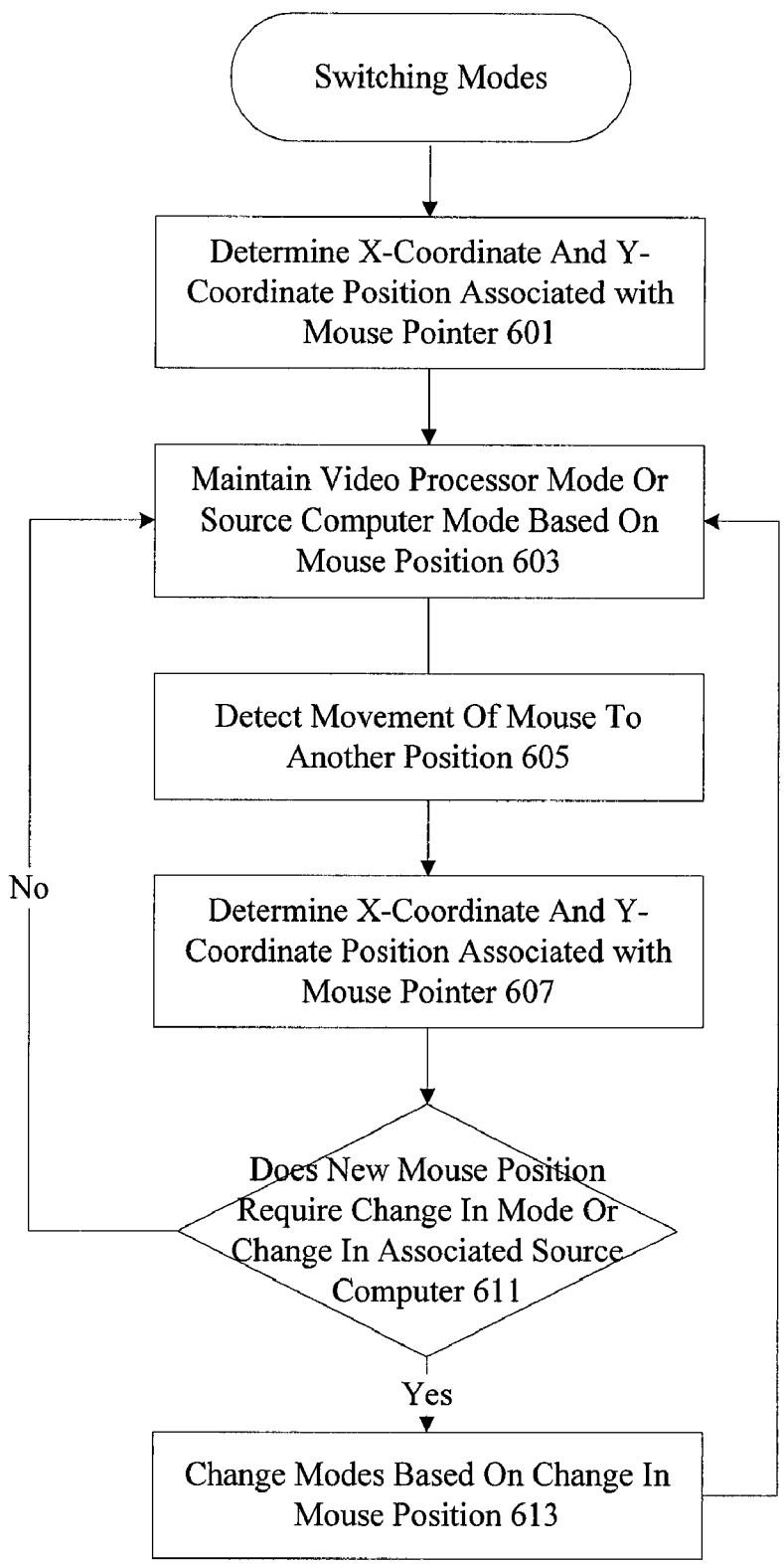
FIG. 6 is a process flow diagram showing a technique for switching modes.

FIG. 6 is a flow process diagram showing one example of a technique for switching modes. At 601, a mouse pointer position associated with an x-coordinate and a y-coordinate in a display system is determined. In some examples, a position may be determined by an application. In other examples, the position may be determined by an operating system or even firmware and the position information may be passed through application program interfaces. At 603, a mode is maintained based on mouse pointer position. For example, the mode may be video processor mode or source computer mode. The source computer mode may be associated with a particular source computer in a group of connected source computers. At 605, movement of the mouse to another position is detected. Again, detection or a new position, movement, or a change in position can be detected by an application, operating system, firmware, or even hardware.

At 607, a new x-coordinate and a new y-coordinate position associated with the mouse pointer is determined. At 611, it is determined if the new mouse position requires a change in mode or change in associated source computer. For example, the mode may change from video processor mode to source computer mode. Alternatively, the source computer may have changed from one source computer to another source computer. If no change is required, the process flows back to maintaining video processor mode at 603. If a change is required, the mode is changed at 613 based on mouse position. For example, the mode may change from source computer mode to video processor mode or from source computer mode associated with one source computer to source computer mode associated with another source computer.

Because such information and program instructions may be employed to implement the systems/methods described herein, the present invention relates to tangible, machine readable media that include program instructions, state information, etc. for performing various operations described herein. Examples of machine-readable media include hard disks, floppy disks, magnetic tape, optical media such as CD-ROM disks and DVDs; magneto-optical media such as optical disks, and hardware devices that are specially configured to store and perform program instructions, such as read-only memory devices (ROM) and programmable read-only memory devices (PROMs). Examples of program instructions include both machine code, such as produced by a compiler, and files containing higher level code that may be executed by the computer using an interpreter.

Although many of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. It is therefore intended that the invention be interpreted to include all variations and equivalents that fall within the true spirit and scope of the present invention.

What is claimed is:

1. A method, comprising:
    determining a first position associated with a mouse pointer the first position outside of a source computer window;
    maintaining a mouse pointer in video processor mode based on the first position, wherein the mouse pointer in video processor mode operates a video processor connected to a plurality of source computers through a plurality of video interfaces;
    detecting movement of the mouse pointer from the first position to a second position, the second position inside the source computer window;
    changing the mouse pointer from video processor mode to source computer mode except if the second position resides in a menu bar inside the source computer window, wherein if the second position resides in the menu bar, the mouse pointer remains in video processor mode, the source computer connected to a control computer over a control network interface, wherein the mouse pointer in source computer mode operates one of a plurality of source computers connected to a video processor and wherein the plurality of video interface carry video more effectively than the control network carries video.

2. The method of claim 1, further comprising:
detecting movement of the mouse pointer from the second position to a third position inside a control computer window;
changing the mouse pointer to control computer mode based on the third position except if the third position resides in a menu bar inside the control computer window, wherein the mouse pointer in control computer mode operates a control computer connected to the video processor.

3. The method of claim 1, wherein the plurality of source computers include computer systems, Digital Video Recorders (DVRs) and Pan-Tilt-Zoom (PTZ) cameras.

4. The method of claim 1, detecting movement of the mouse pointer from the second position to a third position, the third position associated with a third x-coordinate and a third y-coordinate in the display system.

5. The method of claim 4, maintaining the mouse pointer in source computer mode based on the third position, wherein the mouse pointer in source computer mode operates another one of the plurality of source computers connected to the video processor.

6. The method of claim 1, wherein a first mouse pointer graphic corresponds to the mouse pointer in video processor mode.

7. The method of claim 6, wherein a second mouse pointer graphic corresponds to the mouse pointer in source computer mode.

8. The method of claim 1, wherein video processor mode allows the mouse pointer to control the size and placement of windows in the display system.

9. The method of claim 1, wherein source computer mode allows the mouse pointer to control the source computer.

10. The method of claim 1, wherein movement of the mouse pointer switches the mouse pointer between source computer mode and video processor mode.

11. The method of claim 10, wherein movement combined with a click switches the mouse pointer between source computer mode and video processor mode.

12. An apparatus, comprising:
a plurality of source computers;
a video processor connected to the plurality of source computers over a plurality of video interfaces;
a control computer connected to the video processor over a control network interface, the control computer operable to detect movement of a mouse pointer from a first position outside of a source computer window in a display system to a second position inside the source computer window in the display system and change the mouse pointer from video processor mode to source computer mode based on movement to the second position except if the second position resides in a menu bar inside the source computer window, wherein if the second position resides in the menu bar, the mouse pointer remains in video processor mode, wherein the mouse pointer in source computer mode operates one of a plurality of source computers connected to a video processor.

13. The apparatus of claim 12, wherein the control computer is further operable to detect movement of the mouse pointer from the second position to a third position associated with a third x-coordinate and a third y-coordinate in the display system and change the mouse pointer from source computer mode to control computer mode based on the third position, wherein the mouse pointer in control computer mode operates a control computer connected to the video processor.

14. The apparatus of claim 12, wherein the plurality of source computers include computer systems, Digital Video Recorders (DVRs) and Pan-Tilt-Zoom (PTZ) cameras.

15. The apparatus of claim 12, wherein the control computer is further operable to detect movement of the mouse pointer from the second position to a third position, the third position associated with a third x-coordinate and a third y-coordinate in the display system.

16. The apparatus of claim 15, wherein the control computer is further operable to maintain the mouse pointer in source computer mode based on the third position, wherein the mouse pointer in source computer mode operates another one of the plurality of source computers connected to the video processor.

17. The apparatus of claim 12, wherein a first mouse pointer graphic corresponds to the mouse pointer in video processor mode.

18. The apparatus of claim 17, wherein a second mouse pointer graphic corresponds to the mouse pointer in source computer mode.

19. The method of claim 12, wherein video processor mode allows the mouse pointer to control the size and placement of windows in the display system.

20. The apparatus of claim 12, wherein source computer mode allows the mouse pointer to control the source computer.

21. The apparatus of claim 12, wherein movement of the mouse pointer switches the mouse pointer between source computer mode and video processor mode.

22. The apparatus of claim 21, wherein movement combined with a click switches the mouse pointer between source computer mode and video processor mode.

23. An apparatus, comprising:
means for determining a first position associated with a mouse pointer, the first position outside of a source computer window;
means for maintaining a mouse pointer in video processor mode based on the first position, wherein the mouse pointer in video processor mode operates a video processor connected to a plurality of source computers through a plurality of video interfaces;
means for detecting movement of the mouse pointer from the first position to a second position, the second position inside the source computer window;
means for changing the mouse pointer from video processor mode to source computer mode except if the second position resides in a menu bar inside the source computer window, wherein if the second position resides in the menu bar, the mouse pointer remains in video processor mode, the source computer connected to a control computer over a control network interface, wherein the mouse pointer in source computer mode operates one of a plurality of source computers connected to a video processor and wherein the plurality of video interface carry video more effectively than the control network carries video.

24. The apparatus of claim 23, further comprising:

means for detecting movement of the mouse pointer from the second position to a third position, the third position associated with a third x-coordinate and a third y-coordinate in the display system;

means for changing the mouse pointer from source computer mode to control computer mode based on the third position, wherein the mouse pointer in control computer mode operates a control computer connected to the video processor.

25. The apparatus of claim 23, wherein the plurality of source computers include computer systems, Digital Video Recorders (DVRs) and Pan-Tilt-Zoom (PTZ) cameras.

* * * * *